United States Patent
Sanekata et al.

(10) Patent No.: US 12,140,248 B2
(45) Date of Patent: Nov. 12, 2024

(54) FLUID CONTROL VALVE

(71) Applicant: MIKUNI CORPORATION, Tokyo (JP)

(72) Inventors: Yuuhei Sanekata, Odawara (JP); Keigo Suzuki, Odawara (JP); Yuusaku Ide, Odawara (JP); Yuuta Tanaka, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 17/695,192

(22) Filed: Mar. 15, 2022

(65) Prior Publication Data

US 2022/0299116 A1    Sep. 22, 2022

(30) Foreign Application Priority Data

Mar. 17, 2021   (JP) .................................. 2021-043662

(51) Int. Cl.
  *F16K 31/53*   (2006.01)
  *F16K 1/22*    (2006.01)

(52) U.S. Cl.
  CPC ............ *F16K 31/535* (2013.01); *F16K 1/221* (2013.01)

(58) Field of Classification Search
  CPC ....... F16K 1/221; F16K 31/041; F16K 31/535
  See application file for complete search history.

(56) References Cited

U.S. PATENT DOCUMENTS

| | | | |
|---|---|---|---|
| 2006/0157027 A1* | 7/2006 | Ichikawa | F02D 11/10 123/399 |
| 2008/0087858 A1* | 4/2008 | Hatsuzawa | F02D 9/105 324/207.16 |
| 2010/0263618 A1* | 10/2010 | Keefover | F02M 26/70 123/190.1 |
| 2010/0319658 A1* | 12/2010 | Uchiyama | G01D 5/04 123/337 |

(Continued)

FOREIGN PATENT DOCUMENTS

| | | |
|---|---|---|
| CN | 201487353 U | 5/2010 |
| JP | 2012-145487 | 8/2012 |
| JP | 2019-78333 | 5/2019 |

OTHER PUBLICATIONS

Translation of JP 2019078333 (Year: 2023).*
Japanese Office Action dated Aug. 14, 2024 for Japanese Application No. 2021-043662.

*Primary Examiner* — Kelsey E Cary

(57) ABSTRACT

Provided is an electric throttle valve incorporating a deceleration mechanism in a housing space between a cover including a connector and a valve body with the valve body and the cover laser-welded to seal the housing space, in which the deceleration mechanism includes an intermediate shaft disposed to be parallel to a motor shaft and a valve shaft, a first intermediate gear engaged with a motor gear secured to an end portion of the motor shaft, and a second intermediate gear engaged with a valve gear secured to the valve shaft, the first intermediate gear and the second intermediate gear are disposed to be aligned in an axial direction of the intermediate shaft and are integrally configured, the first intermediate gear is disposed to be closer to the electric motor than the second intermediate gear, and the connector is disposed above the motor shaft and on a side of the second intermediate gear.

9 Claims, 5 Drawing Sheets

A-A SECTION

(56) References Cited

U.S. PATENT DOCUMENTS

| | | | |
|---|---|---|---|
| 2011/0094474 A1* | 4/2011 | Ikeda | G01D 11/245 264/277 |
| 2019/0010877 A1* | 1/2019 | Strååt | H02P 3/025 |
| 2021/0170696 A1* | 6/2021 | Sakata | C08K 3/04 |

* cited by examiner

A-A SECTION

FLUID CONTROL VALVE

CROSS REFERENCE TO RELATED APPLICATIONS

This application claims the priority benefit of Japanese Application No. 2021-043662 filed on Mar. 17, 2021, the contents of which are incorporated herein by reference.

BACKGROUND OF THE INVENTION

Field of the Invention

The present invention relates to a structure of a fluid control valve incorporating a deceleration mechanism.

Description of the Related Art

Electric throttle valves have frequently been employed as throttle valves controlling air intake volumes of internal combustion engines mounted in vehicles, for example, in recent years. Many electric throttle valves incorporate electric motors, deceleration mechanisms, and throttle valves in their bodies.

Japanese Patent Laid-Open No. 2019-78333 (hereinafter, referred to as Patent Document 1) discloses an example of an electric throttle valve. The electric throttle valve disclosed in Patent Document 1 includes a body with one surface opened, and a drive shaft of an electric motor and a drive shaft of a valve are disposed to be substantially parallel to an opening direction of the opening portion. Also, a deceleration mechanism shifting rotation of the drive shaft of the electric motor and transmitting the shifted rotation to the drive shaft of the valve is disposed to be exposed from the opening portion of the body. The opening portion of the body has a sealed structure covered with a cover.

Moreover, the cover includes a connector for connection of wiring connected to internal devices such as the electric motor to the outside. In Patent Document 1, the connector is disposed at a position adjacent to a motor gear secured to the drive shaft of the electric motor. Also, the connector is disposed to be directed to a side of the body outside the cover such that the wiring extends in a vertical direction relative to the drive shaft of the electric motor. It is thus possible to reduce the entire dimension of the electric throttle valve in the drive shaft direction.

A technique of welding a body and a cover of a fluid control valve, such as the aforementioned electric throttle valve in Patent Document 1, with a laser beam in order to improve sealability and reduce the weight is known. For example, irradiating an edge portion around an opening portion of the body and an outer circumferential portion of the cover with a laser together to weld the cover to the periphery of the opening portion and thereby to seal the inside of the body is conceived.

However, the fluid control valve with a structure in which the cover includes a connector and the connector is directed to a side as in Patent Document 1 has probability that an end portion of the connector in a projecting direction projects further outward than the outer circumferential portion of the body.

In such a structure in which the connector projects further outward than the outer circumferential portion of the body, there is a concern that the connector becomes an obstruction and a part where the cover and the edge portion of the opening portion of the body cannot be welded occurs.

SUMMARY OF THE INVENTION

The present invention has been made in view of such a problem, and an object thereof is to provide a fluid control valve configurable to be compact as a whole with a structure in which a cover including a connector and a body are laser-welded for sealing.

In order to achieve the aforementioned object, a fluid control valve according to the present invention includes: a valve body having a fluid passage; a valve element adjusting a flow path sectional area of the fluid passage; an electric motor; a cover secured to the valve body and forming a housing space between the cover and the valve body; and a transmission disposed in the housing space, decelerating rotation of a motor shaft as a drive shaft of the electric motor, increasing a drive torque, and transmitting the drive torque to a valve shaft driving the valve element, wherein the motor shaft and the valve shaft are disposed to be parallel to each other, the valve body and the cover are laser-welded to seal the housing space, the transmission includes an input gear secured to an end portion of the motor shaft, an output gear secured to the valve shaft, a first intermediate gear engaged with the input gear, a second intermediate gear secured to the first intermediate gear and engaged with the output gear, and an intermediate shaft disposed to be parallel to the motor shaft and the valve shaft and supporting the first intermediate gear and the second intermediate gear, the first intermediate gear and the second intermediate gear are disposed to be aligned in an axial direction of the intermediate shaft, and the first intermediate gear is disposed to be closer to the electric motor than the second intermediate gear, and the cover is provided with a connector at a position adjacent to an end portion of the drive shaft of the electric motor and beside the second intermediate gear, the connector being configured to connect a power supply line from outside to the electric motor.

According to the fluid control valve of the present invention, a decelerator is accommodated in the housing space inside the cover, the first intermediate gear of the decelerator is disposed to be closer to the electric motor than the second intermediate gear, and the input gear secured to the end portion of the drive shaft of the electric motor is thus disposed on the electric motor side. It is thus possible to dispose the connector to be adjacent to the drive shaft of the electric motor on a side of the second intermediate gear.

In this manner, it is possible to reduce an outer shape dimension of the fluid control valve constituted by the cover including the connector and the body and to compactly configure the entire fluid control valve.

Also, it is possible to curb outward projection of the connector by compactly configuring the cover including the connector. It is thus possible to prevent the connector from becoming an obstruction when the outer circumferential portion of the cover and the body are laser-welded.

DETAILED DESCRIPTION OF THE PREFERRED EMBODIMENTS

Hereinafter, an embodiment of the present invention will be described on the basis of the drawings.

Figure 1:
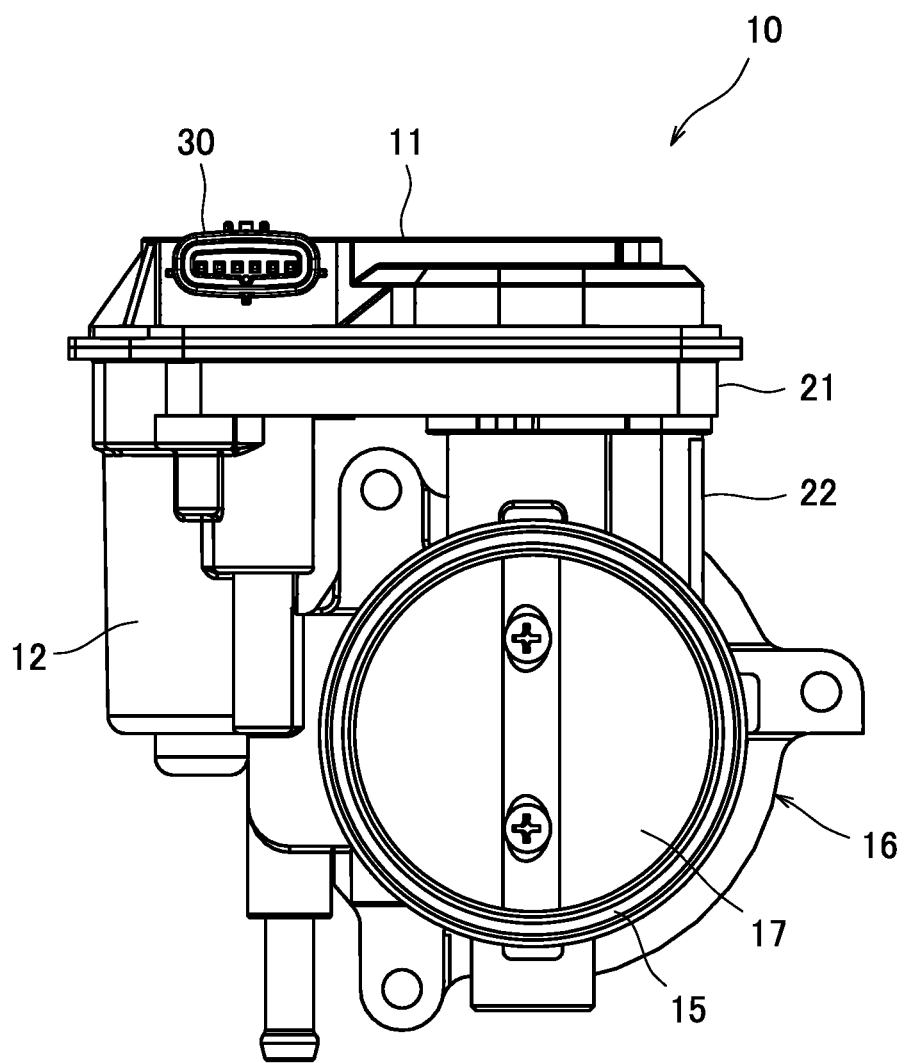
FIG. 1 is a side view of an electric throttle valve according to an embodiment of the present invention.
Figure 2:
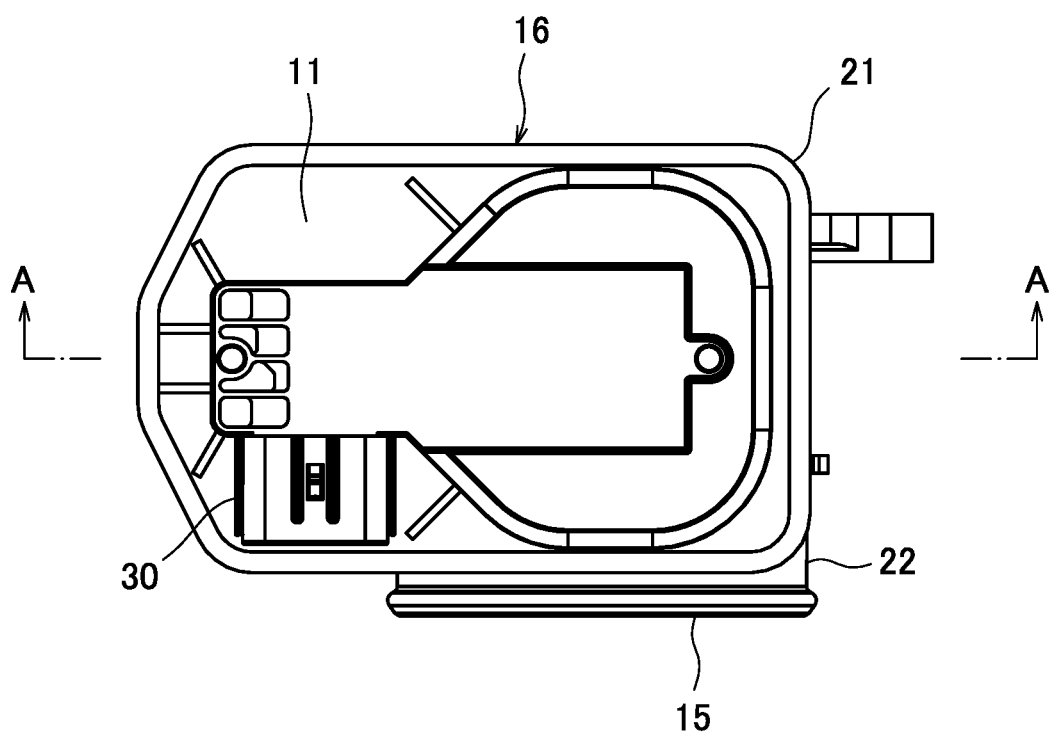
FIG. 2 is a top view of the electric throttle valve according to the present embodiment.
Figure 3:
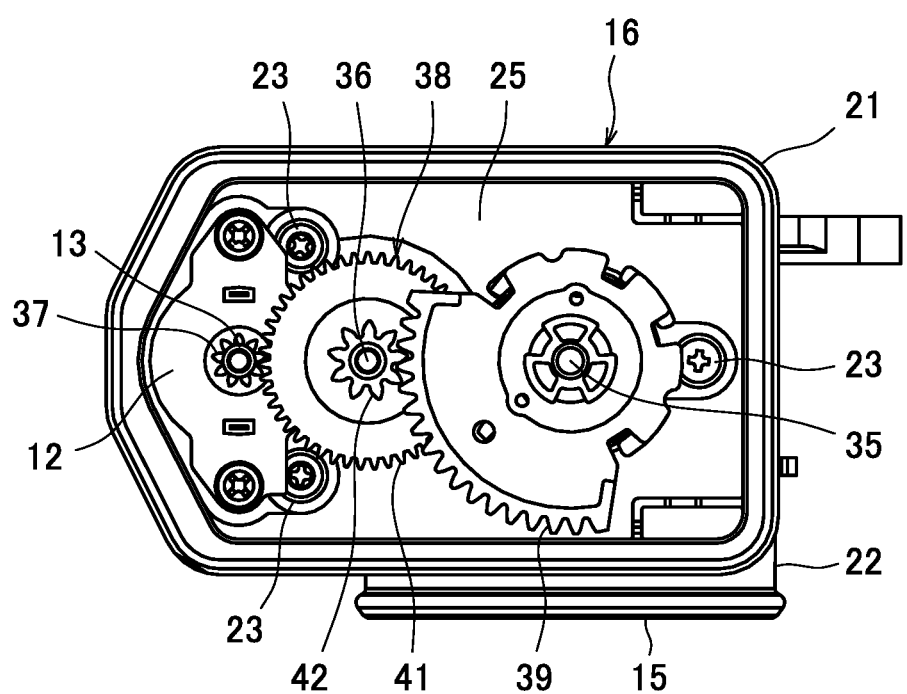
FIG. 3 is a top view of the electric throttle valve with a cover removed therefrom.
Figure 4:
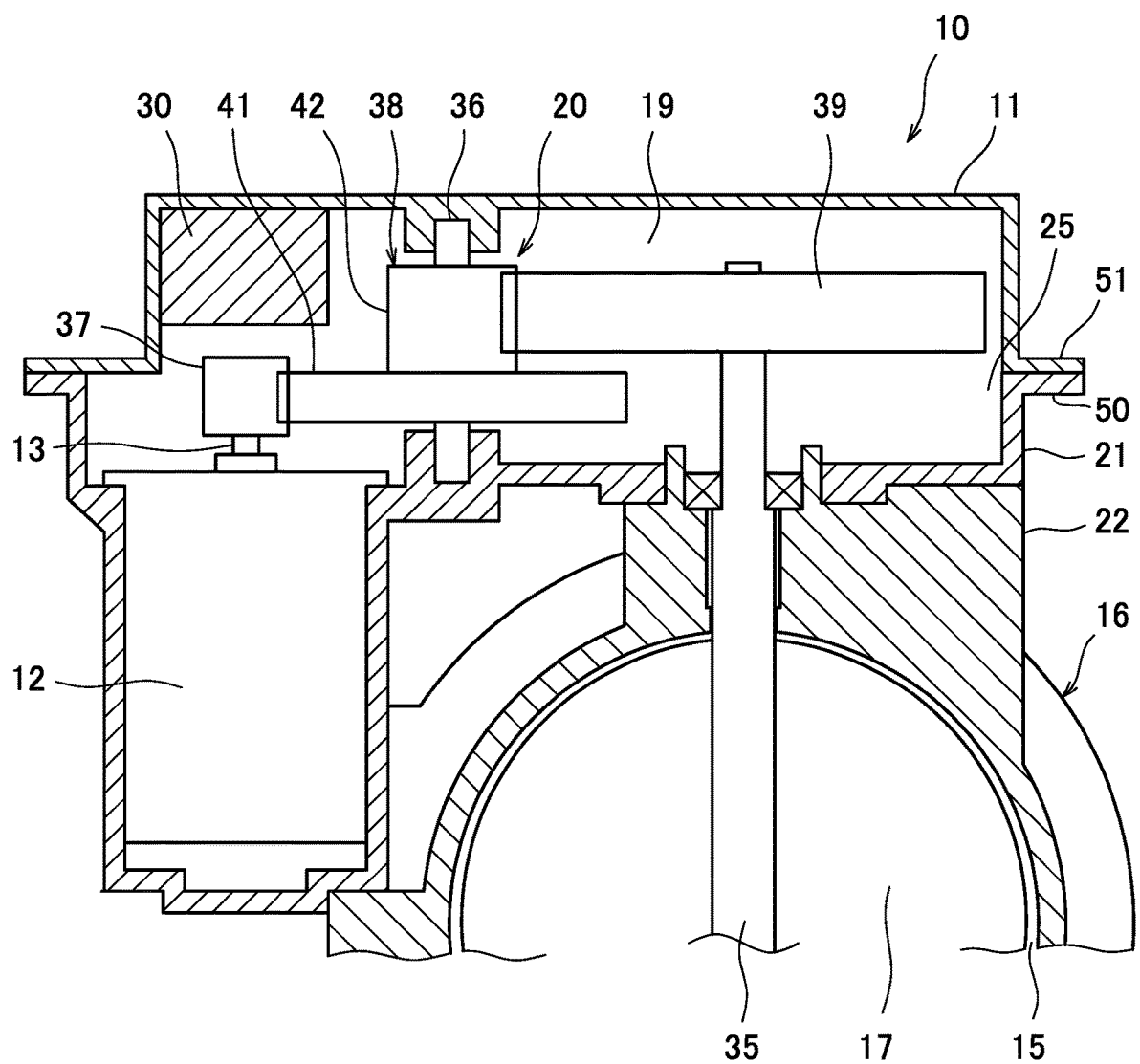
FIG. 4 is a vertical sectional view of an upper portion of the electric throttle valve.

FIG. 1 is a side view of an electric throttle valve 10 (fluid control valve) according to an embodiment of the present invention. FIG. 2 is a top view of the electric throttle valve 10 according to the present embodiment. FIG. 3 is a top view of the electric throttle valve 10 with a cover 11 removed therefrom. FIG. 4 is a vertical sectional view of an upper portion of the electric throttle valve 10. Note that FIG. 4 is a sectional view obtained by cutting the upper portion of the electric throttle valve 10 in a vertical direction parallel to an axial direction of a motor shaft 13 as a drive shaft of an electric motor 12, which will be described later in detail. Note that the following description will be given on the assumption that the axial direction of the motor shaft 13 is an up-down direction.

The electric throttle valve 10 according to an embodiment of the present invention is a fluid control valve controlling an air intake volume of an internal combustion engine mounted in a vehicle, for example.

As illustrated in FIGS. 1 to 3, the electric throttle valve 10 includes a valve body 16 with an intake passage 15 (fluid passage) formed therein, a valve 17 (valve element) opening and closing the intake passage 15 to adjust a flow path sectional area, and the electric motor 12 driving the valve 17.

The valve body 16 has an upper body 21 in which a housing space 19 incorporating the electric motor 12 is formed and a lower body 22 in which the intake passage 15 is formed and the valve 17 is included, and is configured with the upper body 21 and the lower body 22 secured to each other with a bolt 23.

An opening portion 25 is provided at an upper portion of the upper body 21 to face the housing space 19, and the opening portion 25 is covered with the cover 11.

Also, the cover 11 includes a connector 30 for connecting a wiring for supplying power to the electric motor 12 and a wiring for connection to a rotation angle sensor or the like, which is not illustrated, to the outside. The connector 30 is disposed at an upper portion of the electric motor 12 and is disposed to be directed to a side of the valve body 16, that is, to be perpendicularly directed to the axial direction of the motor shaft 13.

As illustrated in FIG. 4, a deceleration mechanism 20 (deceleration mechanism) and the electric motor 12 are accommodated in the housing space 19 between the upper body 21 and the cover 11.

The motor shaft 13 that is a drive shaft of the electric motor 12 and a valve shaft 35 driving the valve 17 extend in the up-down direction and are disposed to be parallel to each other. Upper end portions of the motor shaft 13 and the valve shaft 35 are disposed to be exposed from the opening portion 25 of the upper body 21. In other words, the opening portion 25 of the upper body 21 is opened in an extending direction of the upper end portion of the motor shaft 13.

An intermediate shaft 36 secured to the upper body 21 and extending in the up-down direction to be parallel to the motor shaft 13 and the valve shaft 35 is included between the motor shaft 13 and the valve shaft 35.

The deceleration mechanism 20 is configured with a motor gear 37 (input gear) secured to the upper end portion of the motor shaft 13, the intermediate shaft 36, an intermediate gear 38 rotatably supported at the intermediate shaft 36, and a valve gear 39 (output gear) secured to an upper end portion of the valve shaft 35.

The intermediate gear 38 has a first intermediate gear 41 engaged with the motor gear 37 and a second intermediate gear 42 engaged with the valve gear 39, and the first intermediate gear 41 and the second intermediate gear 42 are secured to each other to be aligned in the up-down direction, that is, in the axial direction of the intermediate shaft 36.

The deceleration mechanism 20 performs rotation drive by transmitting a rotational drive force of the electric motor 12 from the motor shaft 13 to the valve shaft 35 via the motor gear 37, the first intermediate gear 41, the second intermediate gear 42, and the valve gear 39 while decelerating the rotational drive force and causes the valve 17 to perform opening and closing operations.

Note that a return spring, which is not illustrated, is included inside the upper body 21. The return spring causes the valve shaft 35 to rotate relative to the upper body 21 and biases the valve 17 to bring the valve 17 into a predetermined intermediate opening degree state, for example. Therefore, the electric throttle valve 10 is adapted such that the valve 17 is brought into the predetermined intermediate opening degree state when the electric motor 12 stops operating and the valve 17 is caused to perform opening and closing operations from the predetermined intermediate opening degree by causing the electric motor 12 to operate.

In the electric throttle valve 10 according to the present embodiment, the first intermediate gear 41 is disposed to be close to the electric motor 12 side, and the second intermediate gear 42 is disposed on the cover 11 side, in the intermediate gear 38. Therefore, the motor gear 37 is disposed at a position that is close to the electric motor 12 with the position thereof in the axial direction adjusted in accordance with the first intermediate gear 41, and the valve gear 39 is disposed at a position that is far from the valve 17 with the position thereof in the axial direction adjusted in accordance with the second intermediate gear 42.

The connector 30 is disposed in a space above the motor gear 37 in the up-down direction of the page in FIG. 4. In other words, the connector 30 is positioned in the extending direction of the motor shaft 13, is located adjacent to the end portion of the motor shaft 13, and is disposed on a side of the second intermediate gear 42.

Figure 5:
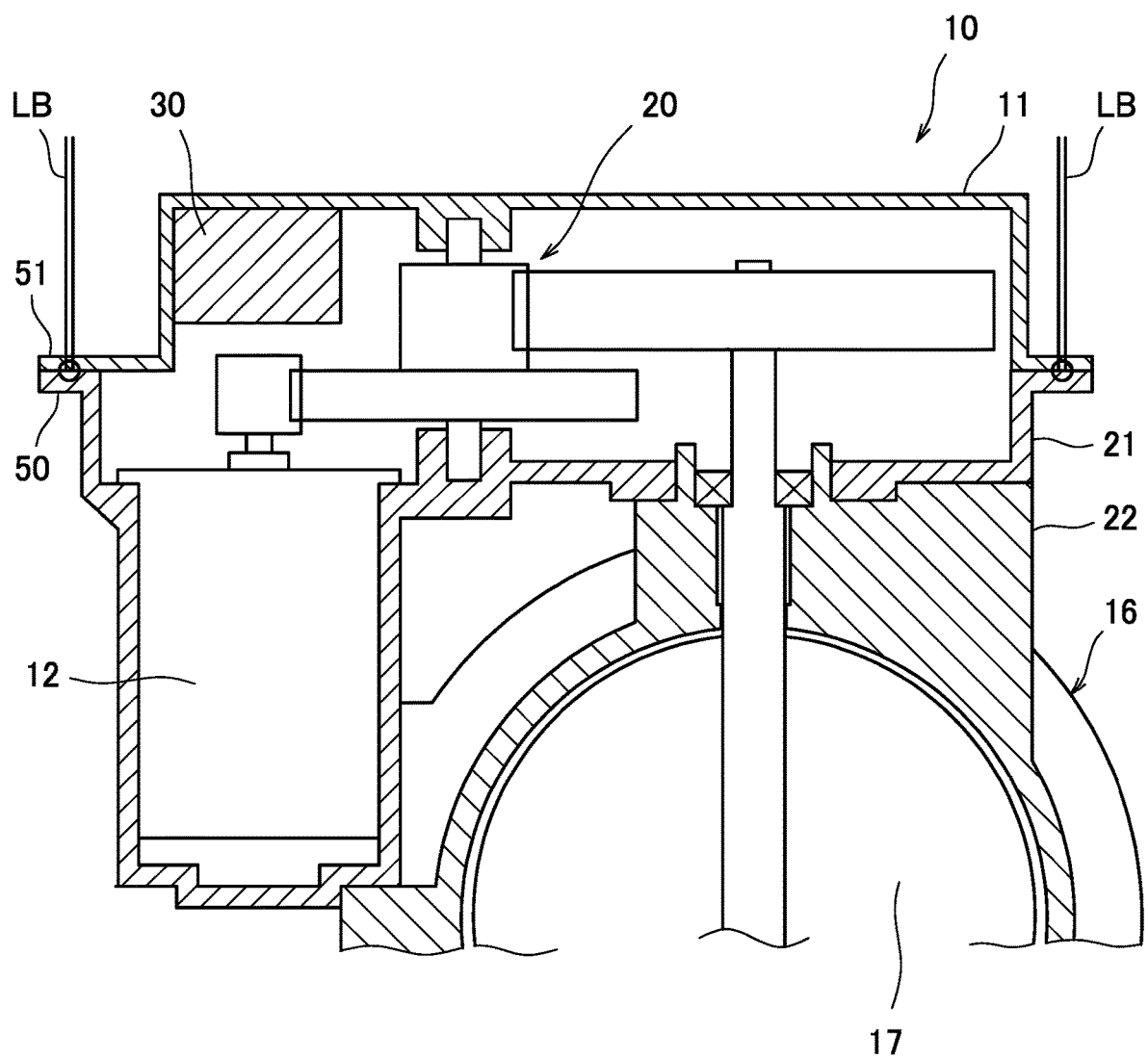
FIG. 5 is an explanatory diagram illustrating how to connect a body and a cover.

FIG. 5 is an explanatory diagram illustrating how to attach the cover 11 in the electric throttle valve 10.

In a case in which the electric throttle valve 10 according to the present embodiment is assembled, the electric motor 12, the deceleration mechanism 20, and the like are placed inside the upper body 21 to which the lower body 22 is secured, the opening portion 25 of the upper portion of the upper body 21 is then covered with the cover 11, and the upper body 21 and the cover 11 are welded and secured to each other using a laser device.

The upper body 21 is formed of a material absorbing a laser beam, and the cover 11 is formed of a material transmitting the laser beam.

As illustrated in FIGS. 4 and 5, an outer circumferential portion of the upper body 21 is provided with a body-side edge portion 50 projecting outward over the entire edge portion of the opening portion 25. Also, an outer circumferential portion of the cover 11 is provided with a cover-side edge portion 51 to overlap the entire periphery of the body-side edge portion 50.

As illustrated in FIG. 5, in a case in which the upper body 21 and the cover 11 are laser-welded, the entire periphery of the cover-side edge portion 51 is irradiated with a laser beam LB from the cover 11 side. In this manner, the cover-side edge portion 51 and the body-side edge portion 50 are laser-welded and secured to each other, and the housing space 19 between the upper body 21 and the cover 11 is sealed.

As described above, the electric throttle valve 10 according to the present embodiment has a structure in which the deceleration mechanism 20 is accommodated in the housing space 19 of the upper body 21 and the cover 11 seals the housing space 19. The upper body 21 and the cover 11 are secured to each other by the edge portions 50 and 51 of the outer circumferential portions being laser-welded, and it is thus possible to reduce the size and the weight as compared with a structure in which the upper body 21 and the cover 11 are secured with a bolt, for example.

The deceleration mechanism 20 is configured with the motor gear 37 secured to the upper end portion of the motor shaft 13, the valve gear 39 secured to the valve shaft 35, the first intermediate gear 41 engaged with the motor gear 37, the second intermediate gear 42 secured to the first intermediate gear 41 and engaged with the valve gear 39, and the intermediate shaft 36 supporting the first intermediate gear 41 and the second intermediate gear 42, and the first intermediate gear 41 and the second intermediate gear 42 are disposed to be aligned in the axial direction of the intermediate shaft 36.

In the present embodiment, the first intermediate gear 41 is disposed to be closer to the electric motor 12 than the second intermediate gear 42, and it is thus possible to provide a space above the upper end portion of the motor shaft 13 and on a side of the second intermediate gear 42 and to dispose the connector 30 connecting a power supply line from the outside to the electric motor 12 in this space. It is only necessary to dispose the connector 30 in the vertical direction relative to the axis of the motor shaft 13, that is, to be directed to a side of the cover 11 as illustrated in FIGS. 1 and 2, for example.

It is thus possible to curb projection of the connector 30 above the cover 11. Also, it is possible to dispose the connector 30 using a wide width (the width in the up-down direction of the page of FIG. 2) of the cover 11 and thereby to curb sideward projection of the connector 30 beyond the cover 11 and the upper body 21. Therefore, it is possible to reduce the outer shape dimension of the electric throttle valve 10 and compactly form the electric throttle valve 10 constituted by the cover 11 including the connector 30 and the valve body 16 and to improve installability in a case in which the electric throttle valve 10 is used as a throttle valve for adjusting the intake flow rate of an internal combustion engine, for example.

Since the upper body 21 is formed of the laser beam absorbing material, and the cover 11 is formed of the laser beam transmitting material, it is possible to weld the upper body 21 and the cover 11 through irradiation with the laser beam from the cover 11 side. In the present embodiment, it is possible to dispose the connector 30 further inward than the edge portions 50 and 51 located at outer circumferential end portions of the upper body 21 and the cover 11 by disposing the connector 30 to be adjacent to a part above the upper end portion of the motor shaft 13 and on the side of the second intermediate gear 42 as described above. It is thus possible to avoid the connector 30 becoming an obstruction of the irradiation when the cover-side edge portion 51 at the outer circumferential portion is irradiated with the laser beam from the cover 11 side for welding and thereby to facilitate manufacturing of the electric throttle valve 10.

Although the description of the embodiment ends now, aspects of the present invention are not limited to the aforementioned embodiment. For example, the detailed shape of each component of the electric throttle valve 10 in the aforementioned embodiment may be different as needed. For example, the connector in the aforementioned embodiment may be disposed to be directed in any direction.

Also, although the electric throttle valve 10 in the aforementioned embodiment is an electric throttle valve controlling the air intake volume of the internal combustion engine, the invention of the present application can be widely applied to other fluid control valves.

REFERENCE SIGNS LIST

10 Electric throttle valve (fluid control valve)
11 Cover
12 Electric motor
13 Motor shaft
15 Intake passage (fluid passage)
16 Valve body
17 Valve (valve element)
19 Housing space
20 Deceleration mechanism (speed changer)
21 Upper body
25 Opening portion
30 Connector
35 Valve shaft
36 Intermediate shaft
37 Motor gear (input gear)
39 Valve gear (output gear)
41 First intermediate gear
42 Second intermediate gear
50 Body-side edge portion
51 Cover-side edge portion

What is claimed is:

1. A fluid control valve comprising:
a valve body having a fluid passage;
a valve element adjusting a flow path sectional area of the fluid passage;
an electric motor;
a cover secured to the valve body and forming a housing space between the cover and the valve body; and
a transmission disposed in the housing space, decelerating rotation of a motor shaft as a drive shaft of the electric motor, increasing a drive torque, and transmitting the drive torque to a valve shaft driving the valve element,
wherein the motor shaft and the valve shaft are disposed to be parallel to each other,
the valve body and the cover are laser-welded to seal the housing space,
the transmission includes an input gear secured to an end portion of the motor shaft, an output gear secured to the valve shaft, a first intermediate gear engaged with the input gear, a second intermediate gear secured to the first intermediate gear and engaged with the output gear, and an intermediate shaft disposed to be parallel to the motor shaft and the valve shaft and supporting the first intermediate gear and the second intermediate gear,
the first intermediate gear and the second intermediate gear are disposed to be aligned in an axial direction of the intermediate shaft, and the first intermediate gear is disposed to be closer to the electric motor than the second intermediate gear,
the second intermediate gear and the output gear are disposed within the cover, and the cover is provided with a connector at a position further inward than an edge portion located at outer circumferential end portion of the cover and adjacent to an end portion of the drive shaft of the electric motor and beside the second intermediate gear and at the same position as the second intermediate gear in the axial direction of the drive shaft of the electric motor, the connector being configured to connect a power supply line from outside to the electric motor.

2. The fluid control valve according to claim 1, wherein the valve body is formed of a laser beam absorbing material, and the cover is formed of a laser beam transmitting material.

3. The fluid control valve according to claim 2, wherein the connector is located in an extending direction of the drive shaft of the electric motor and is disposed to be directed in a vertical direction relative to an axis of the drive shaft.

4. The fluid control valve according to claim 3,
wherein the valve body has an opening portion opened in an extending direction of the end portion of the motor shaft with the housing space formed in the opening portion,
a body-side edge portion projecting outward is provided at an edge portion of the opening portion of the valve body,
a cover-side edge portion projecting outward is provided at an outer circumferential edge of the cover, and
the body-side edge portion and the cover-side edge portion are laser-welded.

5. The fluid control valve according to claim 2,
wherein the valve body has an opening portion opened in an extending direction of the end portion of the motor shaft with the housing space formed in the opening portion,
a body-side edge portion projecting outward is provided at an edge portion of the opening portion of the valve body,
a cover-side edge portion projecting outward is provided at an outer circumferential edge of the cover, and
the body-side edge portion and the cover-side edge portion are laser-welded.

6. The fluid control valve according to claim 1, wherein the connector is located in an extending direction of the drive shaft of the electric motor and is disposed to be directed in a vertical direction relative to an axis of the drive shaft.

7. The fluid control valve according to claim 6,
wherein the valve body has an opening portion opened in an extending direction of the end portion of the motor shaft with the housing space formed in the opening portion,
a body-side edge portion projecting outward is provided at an edge portion of the opening portion of the valve body,
a cover-side edge portion projecting outward is provided at an outer circumferential edge of the cover, and
the body-side edge portion and the cover-side edge portion are laser-welded.

8. The fluid control valve according to claim 1,
wherein the valve body has an opening portion opened in an extending direction of the end portion of the motor shaft with the housing space formed in the opening portion,
a body-side edge portion projecting outward is provided at an edge portion of the opening portion of the valve body,
a cover-side edge portion projecting outward is provided at an outer circumferential edge of the cover, and
the body-side edge portion and the cover-side edge portion are laser-welded.

9. The fluid control valve according to claim 1, wherein the fluid control valve is an electric throttle valve controlling an air intake volume of an internal combustion engine.

* * * * *